US009997195B2

(12) United States Patent
Manning

(10) Patent No.: US 9,997,195 B2
(45) Date of Patent: Jun. 12, 2018

(54) PLAYLIST PROGRAMMING

(71) Applicant: RCRDCLUB Corporation, New York, NY (US)

(72) Inventor: Damian Franken Manning, New York, NY (US)

(73) Assignee: RCRDCLUB Corporation, New York, NY (US)

( * ) Notice: Subject to any disclaimer, the term of this patent is extended or adjusted under 35 U.S.C. 154(b) by 212 days.

(21) Appl. No.: 14/266,675

(22) Filed: Apr. 30, 2014

(65) Prior Publication Data

US 2015/0317312 A1 Nov. 5, 2015

(51) Int. Cl.
*G06F 17/30* (2006.01)
*G11B 27/00* (2006.01)
*G06F 21/00* (2013.01)
*G06Q 50/00* (2012.01)
*G06F 21/10* (2013.01)

(52) U.S. Cl.
CPC ........ *G11B 27/00* (2013.01); *G06F 17/30017* (2013.01); *G06F 17/3053* (2013.01); *G06F 17/30053* (2013.01); *G06F 17/30864* (2013.01); *G06F 21/00* (2013.01); *G06F 21/10* (2013.01); *G06Q 50/00* (2013.01)

(58) Field of Classification Search
USPC ................................................. 707/723, 781
See application file for complete search history.

(56) References Cited

U.S. PATENT DOCUMENTS

| | | | |
|---|---|---|---|
| 2006/0031551 A1* | 2/2006 | Agresta | H04N 7/17318 709/231 |
| 2007/0191108 A1* | 8/2007 | Brunet De Courssou | G07F 17/32 463/42 |
| 2008/0010372 A1* | 1/2008 | Khedouri | G06F 17/30094 709/224 |
| 2008/0060084 A1* | 3/2008 | Gappa | G09B 5/00 726/28 |
| 2009/0077610 A1* | 3/2009 | White | H04N 7/173 725/131 |
| 2009/0228919 A1* | 9/2009 | Zott | H04N 7/17318 725/34 |
| 2010/0162324 A1* | 6/2010 | Mehta | H04N 7/17318 725/61 |
| 2012/0188996 A1* | 7/2012 | Roka | G06F 17/30174 370/350 |
| 2014/0115114 A1* | 4/2014 | Garmark | H04L 65/60 709/219 |

* cited by examiner

*Primary Examiner* — Kim Nguyen
(74) *Attorney, Agent, or Firm* — Morris & Kamlay LLP

(57) ABSTRACT

Systems, device and techniques are disclosed for receiving a request from a user to add a media item to a playlist at a certain playlist position where the media items in the playlist are provided to other users in a media group. Based on a determination that the requesting user has rights to the requested media item, the requested media item may be added to the playlist at the position. When the playlist reaches the position, the user that added the media item to the playlist may be provided with a first version of the media item and the other users in the group may be provided with a second version of the media item. If the user that requested the item to be added to the playlist is determined not to have rights to the media item, the item is added to a position different than the requested position.

15 Claims, 6 Drawing Sheets

PLAYLIST PROGRAMMING

BACKGROUND

Several users may form a media group for listening to or watching the same media together. The media can be provided based on a playlist that identifies the media and the order in which it is to be rendered to the group. A user can submit a request to alter the playlist. An example of such a request is to add an item to the playlist. The user submitting the request may or may not have rights to the item.

BRIEF SUMMARY

According to implementations of the disclosed subject matter, a request to add a media item to a playlist at a first playlist position may be received from a first user. The media items in the playlist may be provided to multiple users including the first user and at least a second user distinct from the first user. A determination may be made whether the first user has rights to a first version of the media item stored at a first location. The requested media item may be added to the playlist at the requested first playlist position. The first version of the media item may be provided to the first user based on determining that the first user has rights to a version of the media item stored at the first location and a second version of the media item may be provided to the at least one second user. The second version of the media item may be stored at a second location distinct from the first location and the second version of the media item may be the same as the first version of the media item.

According to implementations of the disclosed subject matter, a request to add a media item to a playlist at a first playlist position may be received from a first user, from multiple users. A determination may be made that the first user does not have rights to the media item. The requested media item may be added to the playlist at a second position distinct from the first position based on determining that the first user does not have rights to the media item and the media item may be provided to the multiple users, including the first user, based on determining that the first user does not have rights to the media item.

Systems and techniques according to the present disclosure enable performing a media action based on a threshold amount of preference indicators. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
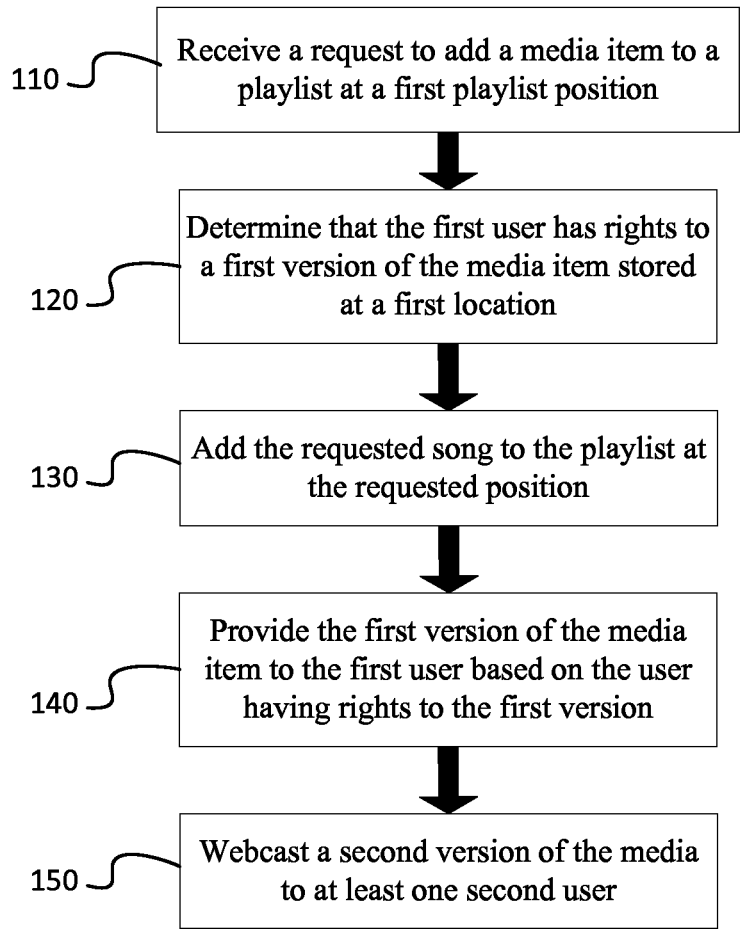
FIG. 1 shows an example process for providing a media item to users, according to an implementation of the disclosed subject matter.

Techniques disclosed herein enable users to request one or more media items (e.g., songs, videos, texts, etc.) to be added to a playlist at a certain playlist position. In accordance with an implementation of the disclosed subject matter, a media item requested for a playlist position may be added to the playlist position if the user requesting the media item has rights to the media item. As an example, if a user has previously purchased a song P, then, if the user is part of a media group and requests that song P is played at a certain position in a playlist for the group, the song can be added to the playlist at that position. Here, a user that has rights to a media item may be more familiar with the media item. Thus, a recommendation made by the user with respect to such a media item may be better informed and more likely to be enjoyed by the group. For example, a user A may have rights to a song Q by artist T. The user A may be in a media group and believe that the other users in the media group may like to listen music by artist T. Accordingly, user A may request that song Q by artist T be added to the playlist to be played, e.g., after a currently playing song. Based on the user A having rights to the song Q, the song may be added to the playlist to be played subsequent to a currently playing song.

Media items in a media group playlist may be played to at least some of the group's users at substantially the same time (a slight variance may result for latency, network connection, etc.). For example, a group of users (members of a media group) may access a virtual music room where the same songs are provided to all of the users that access the music room. A user may submit a request for a media item to be played at a first playlist position. An example of a playlist may be a music playlist that contains a list of either predetermined songs (e.g., song 1, song 2, song 3, etc.) or that determines a song to be played dynamically. An example of a user request for a song to be played at a given playlist position may occur when, say, song 2 is currently playing. The user may request that song X be played after song 2. As disclosed herein, a determination may be made whether the user has rights to the song X (e.g., song purchase, song download, etc.) If the user has rights to song X, then the song may be added to the playlist after song 2. If the user does not have rights to the song X, then the song may not be added to the playlist after song 2. Rather, song X may be placed at a different playlist position than after song 2 or may not be added to the playlist.

A user may be any individual, account owner or application that is capable of accessing a media group via a software or an application. For example, an individual user may have an account with a media group application and access that application via the user's mobile phone. Once in the application, the user may automatically be joined to a media group of which he is already a member, may select a media group to join from a choice of several media groups of which he is already a member or may select one or more media groups to join. An account owner may be an organization. For example an account owner may be a café that has electronic device configured to access a media group software for the purpose of permitting present and prospective group members to access and listen to the songs in group playlists. An application can be software distinct from the media group software that can automatically logon to the media group application and aggregate, store and redistribute playlists and songs of an implementation.

As applied herein, a media group may be any virtual space that two or more users can access the same item of media at substantially the same time. A media group may be associated with one or more specific storage devices or server. It will be understood that although two or more users are provided with media via a media group, individual users may be exposed to the media at slightly different times due to transactional factors such as an internet connection speed, latency, hardware capabilities, software capabilities, location, or the like. As an example, a user A and a user B may be part of the same media group and may be provided a song S at the same time. The song may be output from the speakers of user A's device a second faster than that of the speaker of user B's device due to user B's slower internet connection. As another example, a user A and a user B may access the same playlist via the media group at the same time such that the playlist provides the same content to both user A and B at the same time.

As applied herein, a media item may refer to any renderable content in any medium, such as entertainment content, educational content, news content, financial content, sporting content, food content, travel content, music, video, static and dynamic images, animation, text and the like. As an example, a media group may provide users that are part of the media group with video clips, audio segments, images, etc.

As applied herein, a request to add a media item to a playlist may be made by a user. The request may include manual selection of a media item by a user via a device that provides a media item selection interface. For example, a user may access a media group via the user's mobile phone. The user may have an option to select a media item by selecting the media item either from within the application or from an interface external to the application. A user may be provided with a list of media items to select from or the user may search for a media item from a corpus of media items. As an example of selecting from a list, a user may access a media item selection page within the media group application. The media item selection page may contain hundreds of media items from which the user may select a media item to request. As an example of searching for a media item, a user may input an artist name into a search bar. The user may be provided with one or more media items that match with the artist provided by the user. The user may select one of the one or more media items from the provided media items. Alternatively, a user may request a media item by selecting a media item from a list stored on a user device (e.g., a user generated/stored list, a list of media items contained on a user's phone, etc.). As an example, a user may join a media group and then access the music library on her own mobile phone. The user may select a song from her own music library and request that song to be added to the playlist for the media group. A user may select a song from a list of one or more recently activated (e.g., recently viewed, recently played, etc.) media items or from shared songs from one or more other users.

According to implementations of the disclosed subject matter, as shown at step 110 in FIG. 1, a request to add a media item to a playlist may be received. The request may include a playlist position for the media item to be added. The playlist position may be a specific location within a playlist. The location may be specified as a sequence number (e.g, $5^{th}$, $7^{th}$, etc.), time of play, etc. It may also be specified as a location relative to one or more other songs, e.g., 3 songs after Song Y, two songs before Song Z, 3 minutes after Song W, etc. As an example, a request from a user may state that the requested media item be provided at 5:00 PM. As another example, a request from a user may state that the requested media item be provided after a currently playing song or after two songs have completed. The playlist position may be user selected or may be set by automatically to any applicable position such as, for example, a current position, a position after a currently active media item, a given number of items after a currently active media item (e.g., wait 4 songs before playing a user requested song), a given time, or the like.

A user may provide a request to add a media item to a playlist via any applicable connection such as a wired or wireless connection. A wired connection may include an Ethernet connection to a network such that the media content is transferred from a server, storage, or database to the user's electronic device via the Ethernet connection. A wireless connection may be any non-wired connection via a format such as a Wi-Fi connection, a Bluetooth connection, a radio-frequency connection, an infra-red connection, a near field communication connection, or the like.

A user device (e.g., mobile phone, laptop, desktop, tablet, television, music system, etc.) may communicate with an entity configured to manage the playlist. The request from the user to add a media item may be received by the entity configured to manage the playlist. Here, the entity configured to manage the playlist may be a hardware or software entity and may be, for example, a user device, a server, a database, a storage, a website, an application, a software, or the like. The entity may be local or remote from one or more users (e.g., from the users that join a media group associated with the playlist managed by the entity). As an example, a user who is part of a media group MG may use her mobile phone to select a song P to be played after a currently song being played is over. The mobile phone may communicate the user's request to a webpage that manages the playlist, via a Wi-Fi connection.

According to implementations of the disclosed subject matter, as shown at step 120 in FIG. 1, a determination may be made whether a user requesting to add a media item to a playlist has rights to at least a version of the media item. The determination may be made by comparing metadata associated with the requested media item to metadata or attributes of media items that the user has rights to. The metadata and/or attributes used for the comparison may be any data that can identify a media item such as a media item ID, title, artist, author, genre, composer, actor, album, theme, or the like. As an example, a user may request a video A to be added to video playlist 2 after the currently playing video. The videoID for video A may be known to be VA123. A user video account may contain information regarding all the videos for which the user has rights. Accordingly, the videoID VA123 for video A may be compared to videoIDs associated with the user's video account (i.e., the videos for which the user in this example has rights). If the videoID VA123 matches with a videoID associated with the user's video account then it may be determined that the user has rights to the requested video. If the videoID VA123 does not match with a videoID associated with the user's video account, then it may be determined that the user does not have rights to the requested video.

According to implementations of the disclosed subject matter, as shown at step 130 in FIG. 1, a media item may be added to a playlist at the requested position if the user is determined to have rights to the requested media item. The added media item may take the requested playlist position and a set of one more other media items originally at and after the requested position may be shifted appropriately to accommodate the added item at the requested position. As an example, a playlist may contain five songs [song 1, song 2, song 3, song 4, song 5] in that order and the currently playing song may be song 2. A user may request a song A to be placed after the currently playing song and, therefore, the revised order may be [song 1, song 2, song A, song 3, song 4, song 5] such that songs 3, 4, and 5 are shifted by one position. Alternatively, the added media item may replace a media item that was originally in the requested position. As an example, a playlist may contain five songs [song 1, song 2, song 3, song 4, song 5] in that order and the currently playing song may be song 2. A user may request a song A to be placed after the currently playing song and, therefore, the revised order may be [song 1, song 2, song A, song 4, song 5] such that song A took the position of song 3 and replaced song 3. A playlist position may be any applicable position in an order of media items. As an example, a first playlist position may correlate to the very first media item's position. Alternatively, the first playlist position may be the next position in a playlist, after a current playing media item. Alternatively, a first playlist position may be N media items after a currently playing media item in the playlist, where N is an integer.

Figure 2A:
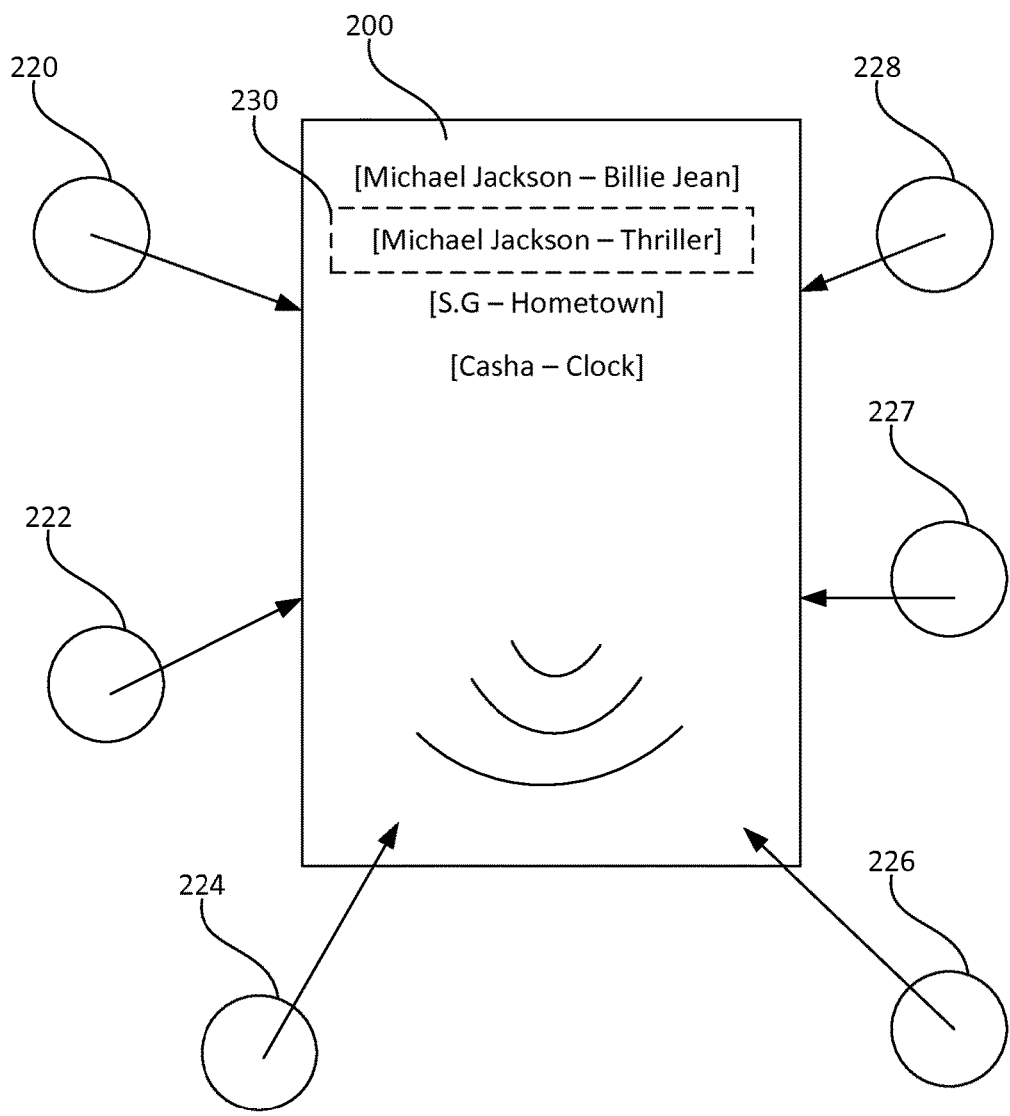
FIG. 2a shows an example playlist with media items, according to an implementation of the disclosed subject matter.
Figure 2B:
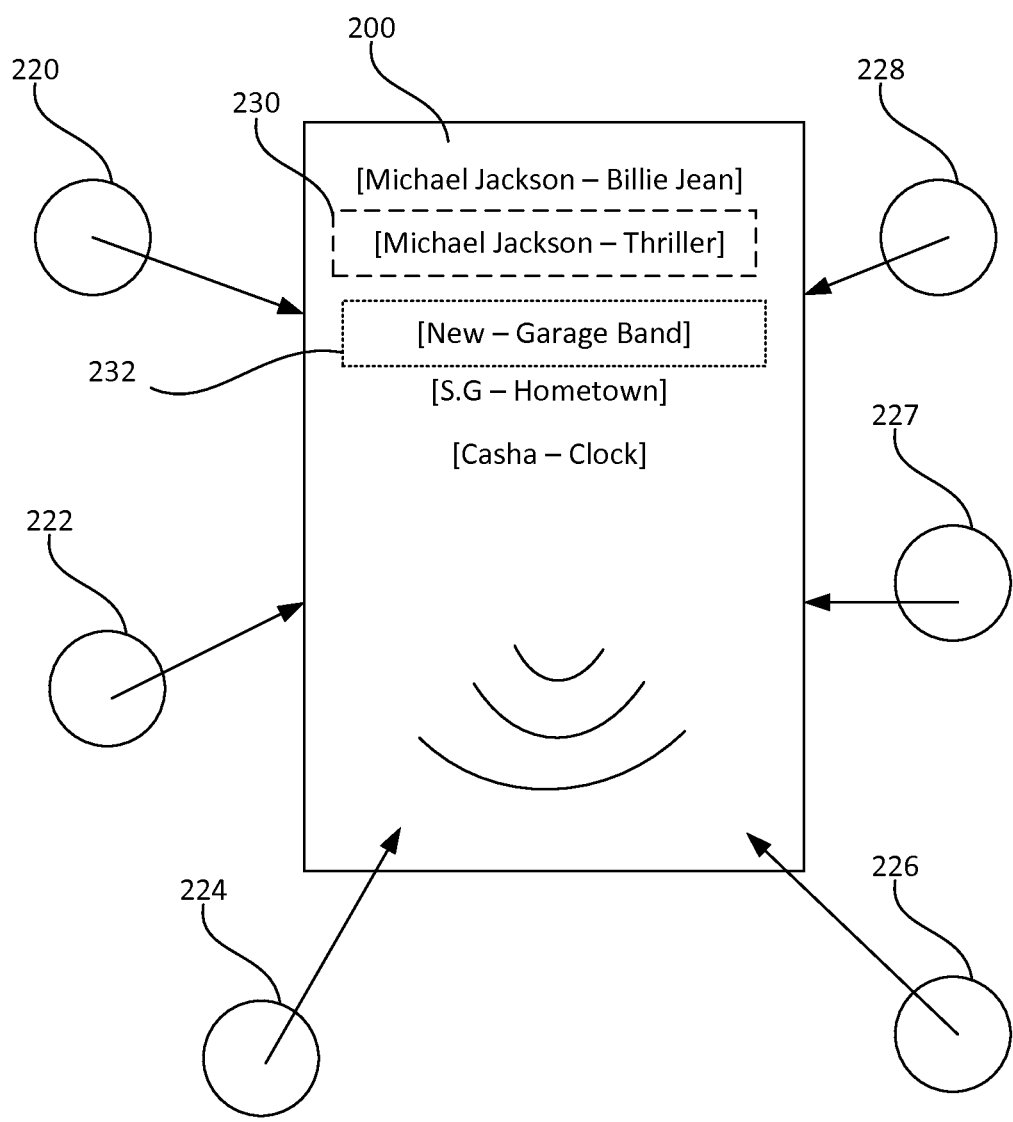
FIG. 2b shows an example playlist with media items in playlist positions, according to an implementation of the disclosed subject matter.

In an illustrative example, as shown in FIG. 2*a*, multiple users may be associated with a media group by selecting the media group using their respective electronic devices. The users 220, 222, 224, 225, 227, and 228 may each activate an application on their respective electronic devices and select the media group associated with the playlist 200. As disclosed herein, the users of the media group may receive the same media items at the same time (e.g., in the ordered determined by the playlist). The playlist 200 may contain four songs and a currently playing song 230 may be Michael Jackson—Thriller. As shown, this song 230 may be at the second position in the playlist followed by S.G—Hometown at the third position. The user 227 may request that a song, Garage Band by New be added to the playlist after the currently playing song. As shown in FIG. 2*b*, the song Hometown by S.G may be shifted down one spot such that it is now at the fourth position and the requested song Garage Band by New may be placed at the position directly after the currently playing song (i.e., third position in this example).

According to implementations of the disclosed subject matter, as shown at step 140 in FIG. 1, a first version of the requested media item may be provided to the user that requested the media item. A version of a media item may be a copy, a file type, a copy at a given location, or the like. The first version may correspond to the version of the media item that the user has rights to. As an example, the user may have rights to a requested media item based on the media item being stored on the user's mobile phone. Here, the user may be provided with the media item that is stored on the user's phone (e.g., play the file stored on the mobile phone) when the playlist is at the requested position. As another example, a user may request a song B to be added to a playlist at a certain position. It may be determined that the user has rights to the song based on a user account containing data indicating that the user purchased the song. Here, a version of the song from a cloud service that stores the song may be provided to the user.

Figure 3A:
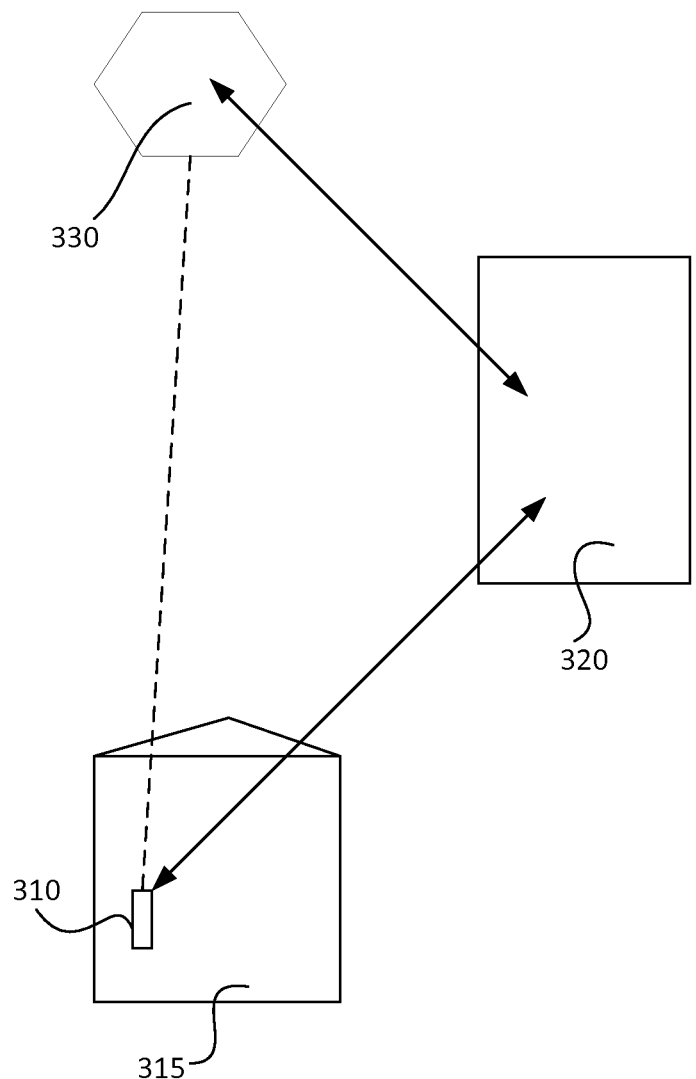
FIG. 3a shows an example illustration of a first user media item request, according to an implementation of the disclosed subject matter.

In an illustrative example of the disclosed subject matter, as shown in FIG. 3*a*, a user located at 315 may use her mobile device 310 to request to add a media item to a playlist at a playlist position. The song may be added to the playlist position based on a determination that the user has rights to the media item being requested. When the playlist reaches the requested playlist position, the entity 320 configured to manage the playlist may notify a content storage server 330, which stores the requested media content, to provide the media content. The content storage server 330 may provide the user's mobile device 310 with the requested media content based on the notification.

According to implementations of the disclosed subject matter, as shown at step 150 in FIG. 1, a second version of the media item may be provided to one or more other users in addition to the user that requested the media item. The one or more other users may be in the same media group as the user that requested the media item. As an example, a user A may request a song to be added to the media group playlist, at position 3, and it may be determined that user A has rights to the song based on the song being on user A's mobile phone. When the playlist is at position 3, the user A may be provided the version of the song that is on the user's playlist and the other users in the media group may be provided with a different version of the song from a cloud server that has the song stored. According to implementations of the disclosed subject matter, the first version of the song and the second version of the song may be the same. Here, the user that requests the song and has rights to the song may be provided with the same version of the song as the other users in a media group. In another implementation, the versions may be different renditions of the same song, e.g., by different artists, by the same artist but from a different performance or arrangement of the song, etc. As an example, a user B may request a song to be added to the media group playlist, at position 4, and it may be determined that user B has rights to the song based on a rights list associated with the user's music account. Here, user B as well as the other users in the media group may be provided with the song from the same cloud storage.

Figure 3B:
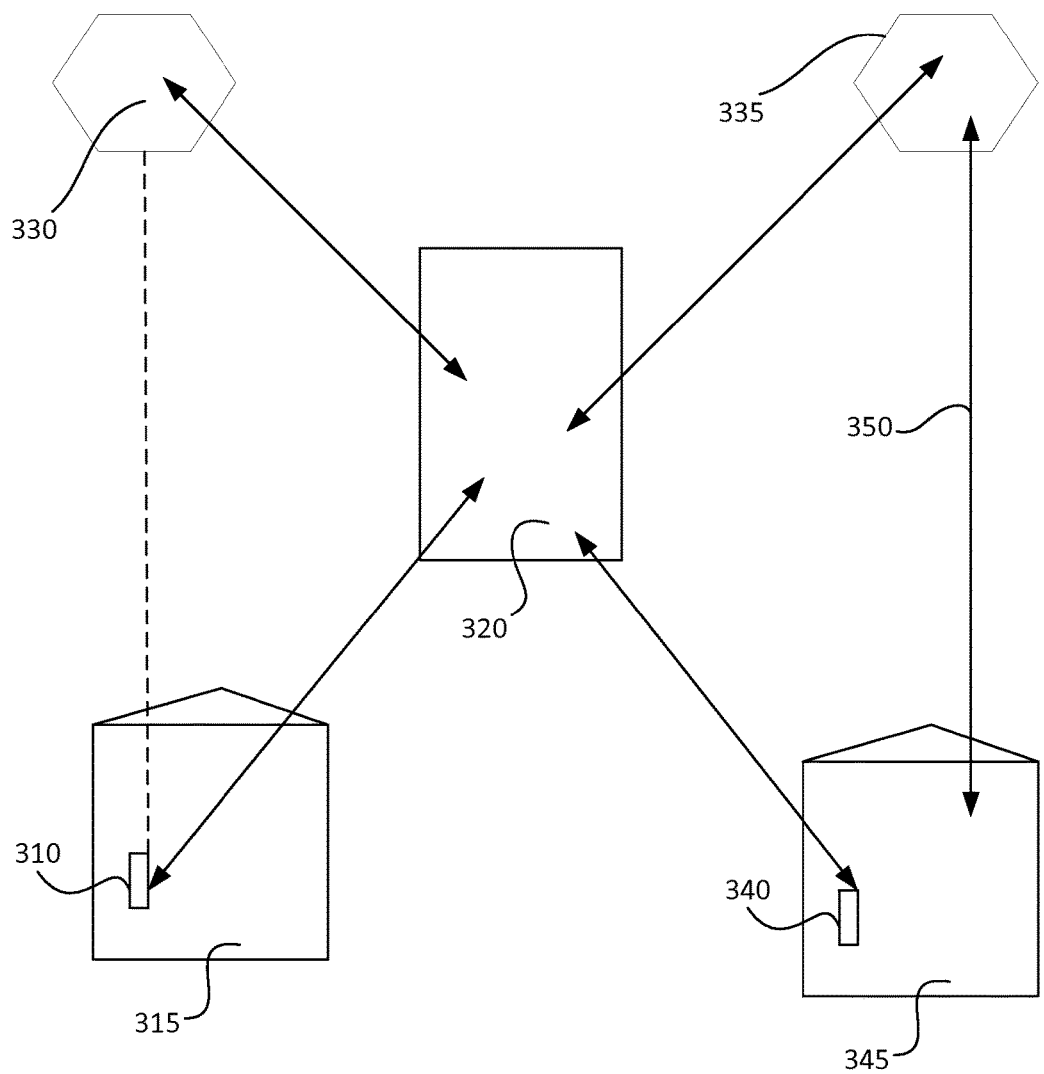
FIG. 3b shows another example illustration of preference indicators, according to an implementation of the disclosed subject matter.

FIG. 3*b* illustrates an example of a user that proposed a media item for a playlist, receiving a first version of the media item while another user receives a different version of the media item. As shown, the user requesting the media item and located at 315 may use her mobile device 510 to request to add a media item to a playlist at a playlist position. The song may be added to the playlist position based on a determination that the user has rights to the media item being requested. When the playlist reaches the requested playlist position, the entity 520 configured to manage the playlist may notify a first content storage server 330, which stores the requested media content, to provide the media content to the user that requested the media content that has rights to the content. The first content storage server 330 may provide the user's mobile device 510 with the requested media content based on the notification. Additionally, the entity 520 configured to manage the playlist may notify a second content storage server 335, which stores a second version of the requested media content, to provide the second version of the media content to the a different user's mobile phone 340 at location 345.

According to implementations of the disclosed subject matter, a playlist position for a requested media item may be determined based on a user rank, user type, awards and/or a token amount. A first user that ranks higher than a second user may be allowed to request a media item at a more desirable playlist position than a user with a lower rank. As an example, a user A with a higher rank than a user B may be able to request a media item at a playlist position directly after a currently playing media item. However, the lower ranked user B may only be able to request a media item at a playlist position two positions after a currently playing media item. A user type may be a host, a guest, a tastemaker, an active user, a passive user, or the like. A host may correspond to the first user that accessed a media group or a user that initiated the media group. As an example, a user may detect the absence of 90s classical hip-hop media groups and may opt to initiate a media group for 90s classical hip-hop. A guest may be any other user than a host user. A tastemaker may be a user that is associated with more popular media content than other users. As an example, media content provided by media groups may be selected from the media content in media libraries of the users (e.g., personal music library on a user's mobile phone) within the media group. A tastemaker may be a user whose media content receives positive or affirmative preference indicators. An active user may be a user that participates in one or more media groups more than one or more other users (e.g., provides preference indicators that are not null indicators). A passive user may be a user that does not participate in one or more media groups when compared to one or more other users (e.g., constantly provides null indicators). Similar to a user rank, the playlist position that a specific type of user may request a media item for may depend on the user's type. One or more users may be provided with or have accumulated awards (e.g., based on use, contribution, user type, etc.). The user may apply the awards along with a request to add a media item and the position for the media item may be determined based on the applied awards. The awards may be used for other benefits as well such as merchandise or discounts from a sponsor. One or more users may provide a token amount. The token amount may correspond to tokens accumulated via use of an application, a financial contribution, an awarded amount, or the like. A user may contribute a number of tokens along with a request to add a media item and the position for the media item may be determined based on the tokens contributed to the request.

According to an implementation of the disclosed subject matter, a user that does not request a media item to be added to a playlist may opt to acquire (e.g., download, gain rights to, access, etc.) a requested media item. Here, such a user may not have rights and/or access to the media item that was added to the playlist based on the request from a requesting user. Such a user may be exposed to the media item and may wish to acquire the media item. Accordingly, the user may provide a request to acquire the media item. The media item may be provided to the user from any applicable location such as the requesting user's storage, a cloud storage, a third party media storage, or the like. As an example, a user A may request that a song 1 is added to a playlist at the first position after a currently playing song. The song 1 may be added to the playlist based on the user A having rights to the song. Song 1 may be provided to all the users in a media group, including user A and a second user, user B, via her mobile device. User B may select a button on her mobile device to provide a request to acquire the song 1. Based on the request to acquire the song, a media cloud server may provide song 1 to user B's mobile device.

According to implementations of the disclosed subject matter, a request to add a media item to a playlist at a first playlist position may be received, as disclosed herein. A determination may be made that the user providing the request does not have rights to the media item. Based on the determination that the user does not have rights to the media item, the requested media item may be placed at a second position (i.e., a position other than the requested first position). In an implementation, a user that requests a media item to be added at a specific playlist position can be required to have rights to the media item for the media item to be placed at the specific playlist position. If the user does not have rights then the media item may either not be placed in the playlist or may be placed at a media position different than the requested media position in the playlist. The requested media item may be provided to the requesting user as well as any other users that are part of the media group when its position is reached in the playlist. Alternatively, a preview of the media item may be placed in the playlist instead of the media item itself. For example, if a user that requests a song does not have rights to the song, a smaller clip of the song may be provided instead of the song itself.

Figure 4:
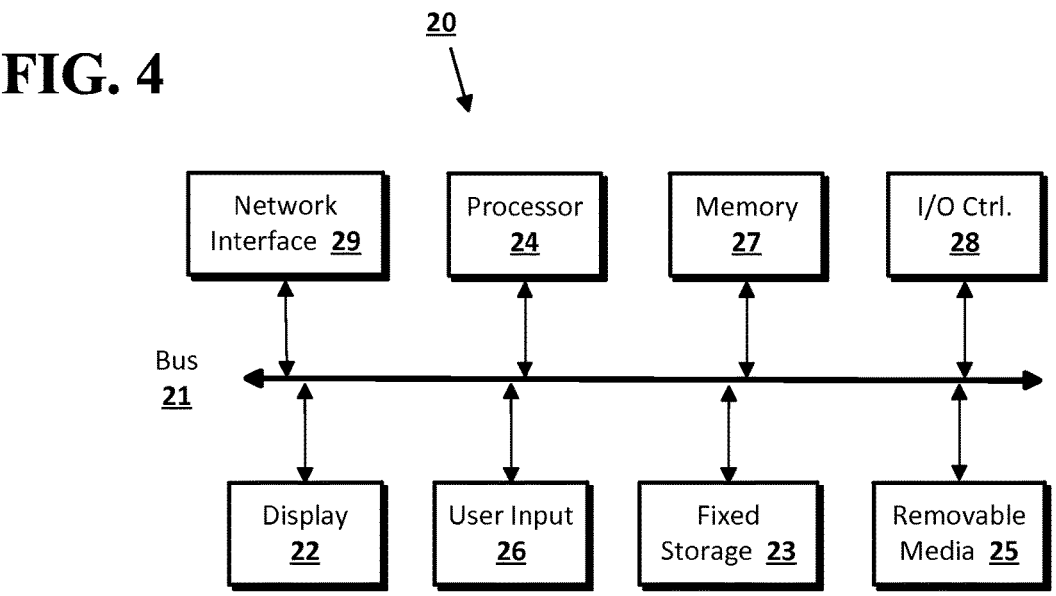
FIG. 4 shows a computer according to an implementation of the disclosed subject matter.

Implementations of the presently disclosed subject matter may be implemented in and used with a variety of component and network architectures (e.g., online media groups). FIG. 4 is an example computer 20 (e.g., a mobile device, computer, laptop, etc.) suitable for implementing implementations of the presently disclosed subject matter. Alternatively, any device disclosed herein configured to electronically transport, generate, or modify data or information may utilize a computer. The computer (e.g., microcomputer) 20 includes a bus 21 which interconnects major components of the computer 20, such as a central processor 24, a memory 27 (typically RAM, but which may also include ROM, flash RAM, or the like), an input/output controller 28, a player display 22, such as a display or touch screen via a display adapter, a player input interface 26, which may include one or more controllers and associated player input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
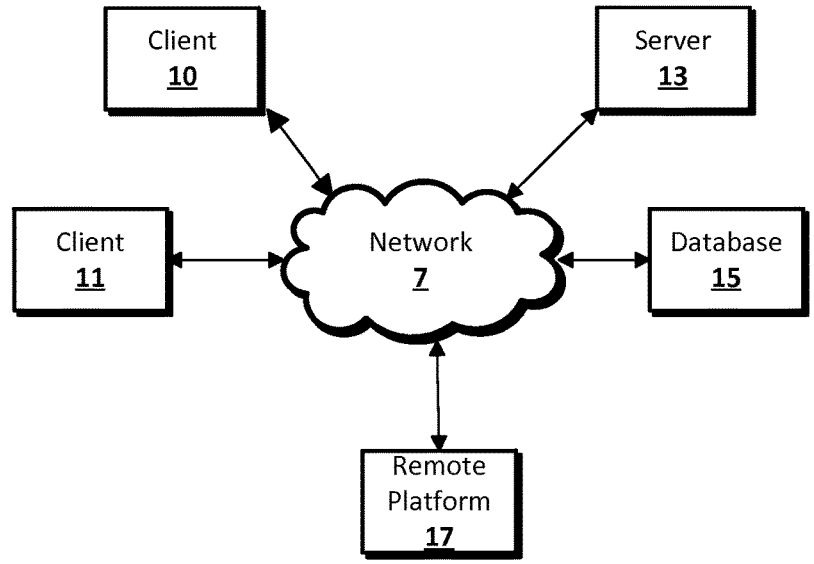
FIG. 5 shows a network configuration according to an implementation of the disclosed subject matter.

FIG. 5 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, from a first user of a media group that includes a plurality of users, a request to add a media item to a playlist for the media group at a first playlist position, wherein media items in the playlist are provided to the plurality of users of the media group that include the first user and at least one second user distinct from the first user, wherein the first playlist position is determined based on a first user rank and based on a type of the first user, and wherein the type of the first user is selected from the group consisting of: a host user, a guest user, a tastemaker, an active user, and a passive user, and wherein the at least one second user has a second user rank that is different from the first user rank;
determining that the first user has rights to a first version of the media item stored at a first location;
adding the requested media item to the playlist for the media group at the requested first playlist position;
providing the first version of the media item to the first user of the media group, based on determining that the first user has rights to a version of the media item stored at the first location; and
providing a second version of the media item to the at least one second user of the media group when it is determined that the at least one second user has rights to the second version of the media item.

2. The method of claim 1, wherein the second version of the media item is stored at a second location distinct from the first location.

3. The method of claim 1, wherein the second version of the media item is the same as the first version of the media item.

4. The method of claim 3, wherein the first location is the same as the second location.

5. The method of claim 1, wherein the first location is a mobile device of the first user.

6. The method of claim 1, wherein the second location is a remote storage location.

7. The method of claim 1, wherein the media item is selected from the group consisting of: an audio, a video, and a text.

8. The method of claim 1, wherein the playlist has a currently playing media item and the first playlist position is the next position in the playlist, after the currently playing media item.

9. The method of claim 1, wherein the playlist has a currently playing media item and the first playlist position is N media items after the currently playing media item in the playlist.

10. The method of claim 1, wherein the first playlist position is determined based on a token amount provided by the first user.

11. The method of claim 1, wherein determining that the first user has rights to the first version of the media item further comprises analyzing a list of media items to which the first user has rights.

12. The method of claim 1, further comprising:
receiving a request from the second user to acquire the first media item; and
providing the second user with the first media item.

13. The method of claim 12, wherein providing the second user with the first media item comprises providing the first media item to the second user's mobile device.

14. The method of claim 12, wherein providing the second user with the first media item comprises receiving the first media item from a third party storage location.

15. A system comprising:
a processor configured to:
receive, from a first user of a media group that includes a plurality of users, a request to add a media item to a playlist for the media group at a first playlist position, wherein media items in the playlist are provided to the plurality of users of the media group that include the first user and at least one second user distinct from the first user, wherein the first playlist position is determined based on a first user rank and based on a type of the first user, and wherein the type of the first user is selected from the group consisting of: a host user, a guest user, a tastemaker, an active user, and a passive user, and wherein the at least one second user has a second user rank that is different from the first user rank;
determine that the first user has rights to a first version of the media item stored at a first location;
add the requested media item to the playlist for the media group at the requested first playlist position;
provide the first version of the media item to the first user of the media group, based on determining that the first user has rights to a version of the media item stored at the first location; and
provide a second version of the media item to the at least one second user of the media group when it is determined that the at least one second user has rights to the second version of the media item.

\* \* \* \* \*